US011652622B2

(12) United States Patent
Gotsman et al.

(10) Patent No.: US 11,652,622 B2
(45) Date of Patent: May 16, 2023

(54) SYSTEMS AND METHODS FOR PRIVACY-RESERVING DATA HIDING

(71) Applicants: New Jersey Institute of Technology, Newark, NJ (US); Universita della Svizzera Italiana, Lugano (CH)

(72) Inventors: Craig Gotsman, Jersey City, NJ (US); Kai Hormann, Pregassona (CH)

(73) Assignees: New Jersey Institute of Technology, Newark, NJ (US); Universita Della Svizzera Italiana, Lugano (CH)

( * ) Notice: Subject to any disclaimer, the term of this patent is extended or adjusted under 35 U.S.C. 154(b) by 100 days.

(21) Appl. No.: 17/395,974

(22) Filed: Aug. 6, 2021

(65) Prior Publication Data
US 2022/0045858 A1 Feb. 10, 2022

Related U.S. Application Data

(60) Provisional application No. 63/062,828, filed on Aug. 7, 2020.

(51) Int. Cl.
*H04L 9/08* (2006.01)
*G06F 21/62* (2013.01)
*H03M 13/19* (2006.01)

(52) U.S. Cl.
CPC ........ *H04L 9/0872* (2013.01); *G06F 21/6254* (2013.01); *H03M 13/19* (2013.01); *H04L 9/0894* (2013.01)

(58) Field of Classification Search
CPC . H04L 9/0872; H04L 9/0894; H04L 2209/34; H04L 2209/42; H04L 2209/88;
(Continued)

(56) References Cited

U.S. PATENT DOCUMENTS 6,639,516 B1 * 10/2003 Copley ................ G08B 29/046
340/687
8,560,236 B1 * 10/2013 Zahir ................. G01C 21/3407
701/533
(Continued)

FOREIGN PATENT DOCUMENTS

WO WO-2005018250 A1 * 2/2005 ......... G07C 9/00111
WO WO-2005038590 A2 * 4/2005 ............... G07C 9/28
(Continued)

OTHER PUBLICATIONS

Garner, The Residue Number System, in Proc. Western Joint Computer Conference, Ser. IRE-AIEE-ACM '59, (Western), ACM, 1959, pp. 146-153.
(Continued)

Primary Examiner — Matthew Smithers
(74) Attorney, Agent, or Firm — McCarter & English LLP

(57) ABSTRACT

Described in detail herein is a method for encrypting or encoding time-stamped location data associated with a computing device. The method converts time and location information associated with the computing device into a vector format. The method generates a code vector based on the converted time and location vector. The method sorts entries in the code vector based at least in part on a predetermined ordering scheme. The method executes a random modification to each of the sorted entries. The method compares the code vector to at least one other code vector associated with another computing device. The method identifies other code vectors within a specified distance of the given code vector. The method concludes that the computing device and the at least one other computing device were in proximity to each other during a time period corresponding to the time information.

21 Claims, 7 Drawing Sheets

(58) Field of Classification Search
CPC ... H04L 9/3239; G06F 21/6254; H03M 13/19
See application file for complete search history.

(56) References Cited

U.S. PATENT DOCUMENTS

| | | | | |
|---|---|---|---|---|
| 11,477,611 | B2* | 10/2022 | Xie | G06Q 50/26 |
| 2009/0323972 | A1* | 12/2009 | Kohno | H04L 9/0631 380/284 |
| 2010/0097209 | A1* | 4/2010 | Wong | G01S 5/0284 340/539.13 |
| 2012/0324228 | A1* | 12/2012 | Padhye | H04L 9/321 713/176 |
| 2016/0044625 | A1* | 2/2016 | Anesi | H04W 12/04 455/411 |
| 2018/0293869 | A1* | 10/2018 | Padhye | G08B 21/10 |
| 2021/0058736 | A1* | 2/2021 | Ghazzaoui | H04W 4/80 |
| 2021/0313074 | A1* | 10/2021 | Mesirow | G16H 10/40 |
| 2021/0348949 | A1* | 11/2021 | Cobler | H04W 4/023 |
| 2021/0365445 | A1* | 11/2021 | Robell | G06F 16/90 |
| 2021/0399873 | A1* | 12/2021 | Duchin | H04L 9/006 |
| 2021/0400439 | A1* | 12/2021 | Troester | H04W 12/03 |
| 2022/0014357 | A1* | 1/2022 | Jones | H04L 9/0643 |
| 2022/0022821 | A1* | 1/2022 | Rodgers | G16H 50/80 |
| 2022/0051808 | A1* | 2/2022 | Miettinen | G16H 40/40 |
| 2022/0104008 | A1* | 3/2022 | Luo | H04W 12/02 |

FOREIGN PATENT DOCUMENTS

| | | | | |
|---|---|---|---|---|
| WO | WO-2009092117 | A1* | 7/2009 | G01S 5/02 |
| WO | WO-2015006858 | A1* | 1/2015 | A01G 22/00 |

OTHER PUBLICATIONS

Reed, et al., Polynomial Codes Over Certain Finite Fields, J. Soc. Indust. App. Math., vol. 8, No. 2, pp. 300-304, 1960.
Watson, et al., Self-Checked Computation Using Residue Arithmetic, Proc. IEEE, vol. 54, No. 12, pp. 1920-1931, 1966.
Barsi, et al., Error Correcting Properties of Redundant Residue Number Systems, IEEE Trans. Comput., vol. C-22, No. 3, pp. 307-315, 1973.
Shamir, How to Share a Secret, Commun. ACM, vol. 22, No. 11, pp. 612-613, 1979.
Asmuth, et al., A Modular Approach to Key Safeguarding, IEEE Trans. Inf. Theory, vol. 29, No. 2, pp. 208-210, 1983.
Mignotte, How to Share a Secret, in Cryptography, ser. Lecture Notes in Computer Science, T. Beth, Ed., Springer, 1983, vol. 149, pp. 371-375.
Goldreich, et al., Chinese Remaindering with Errors, IEEE Trans. Inf. Theory, vol. 46, No. 4, pp. 1330-1338, 2000.
Gao, A New Algorithm for Decoding Reed-Solomon Codes, in Communications Information and Network Security, ser. Springer International Series in Engineering and Computer Science, V.K. Bhargava, H.V. Poor, V. Tarokh, and S. Yoon, Eds., Springer, 2003, vol. 712, Ch. 5, pp. 55-68.
Manku, et al., Detecting Near-Duplicates for Web Crawling, in Proce $16^{th}$ Intl. Conf. World Wide Web, ser. WWW '07., ACM, 2007, pp. 141-150.
Liu, et al., Large Scale Hamming Distance, Query Processing, in Proc. $27^{th}$ IEEE intl. Conf. Data Engineering, ser. ICDE, IEEE Computer Society, 2011, pp. 553-564.
Cheng, et al., Polynomial-Based Modifiable Blockchain Structure for Removing Fraud Transactions, Future Gener. Comput. Syst., vol. 99, pp. 154-163, 2019.
Berke et al., Assessing Disease Exposure Risk with Location Data: A Proposal for Cryptographic Preservation of Privacy, 2020.
Bell, et al., TraceSecure: Towards Privacy Preserving Contact Tracing, 2020, arXiv:2010.03232 [cs.CR].
Fitzsimons, et al., A Note on Blind Contact Tracing at Scale with Applications to the COVID-19 Pandemic, in Proc. $15^{th}$ INT. Conf. Availab. Reliab. Secur., 2020, pp. 92:1-6.
Google Exposure Notification, Bluetooth® Specification, Preliminary—Subject to Modification and Extension, 2020 (9 pages).
Google Exposure Notification, Cryptography Specification, Preliminary—Subject to Modification and Extension, 2020 (12 pages).

* cited by examiner

| coding method | encrypted vector length | alphabet size | data vector size (base $p$) | corrupted coordinates | matching threshold | encrypted vector size (bits) | expected # of false positives | "direct attack" complexity |
|---|---|---|---|---|---|---|---|---|
| | $n$ | $p$ | $m = \lceil \log_p M \rceil$ | $k$ | $\tau$ | $\lceil n \log_2 p \rceil$ | $D^2 s(n, p, \tau)$ | $\dfrac{n!}{(n-m)!} \exp\left(\dfrac{km}{n}\right)$ |
| polynomial | 100 | 503 | 8 | 10 | 20 | 898 | $10^{-43}$ | $10^{16}$ |
| polynomial | 100 | 101 | 10 | 1 | 2 | 666 | $10^{-10}$ | $10^{20}$ |
| polynomial | 200 | 211 | 9 | 20 | 40 | 1,545 | $10^{-5}$ | $10^{21}$ |
| residues | 80 | $\approx 1{,}143$ | 7 | 8 | 16 | 858 | $10^{-58}$ | $10^{13}$ |

Table 1. Parameters of the different settings for world size $M=1019$ and database entries $D=1014$.

FIG. 7

SYSTEMS AND METHODS FOR PRIVACY-RESERVING DATA HIDING

CROSS-REFERENCE TO RELATED PATENT APPLICATIONS

This application claims priority to U.S. Provisional Application No. 63/062,828, filed on Aug. 7, 2020, the content of which is incorporated by reference herein in its entirety.

BACKGROUND

Mobile technology provides the ability to track a user of a mobile phone as they move. This can be especially useful in tracing the user's interaction with other mobile phone users in public during a time of a public health crisis. Contact tracing can be an effective tool in controlling the spread of infectious diseases such as COVID-19. It involves digital monitoring and recording of physical proximity between people over time with a central and trusted authority, so that when one user reports infection, it is possible to identify all other users who have been in close proximity to that person during a relevant time period in the past and alert them. One way to achieve this involves recording on the server the locations, e.g., by reading and reporting the GPS coordinates of a smartphone, of all users over time. Despite its simplicity, privacy concerns have prevented widespread adoption of this method. Technology that would enable the "hiding" of data could go a long way towards alleviating privacy concerns and enable contact tracing at a very large scale.

SUMMARY

Described herein methods, systems, devices, and non-transitory computer-readable media for encrypting or encoding location data associated with a computing device into a code vector to hide the location data. In accordance with example embodiments of the disclosure, a method is disclosed that can convert time and location information associated with the location data of the computing device at given time or time period into a vector format. The method can then generate the code vector based on the converted time and location vector using a linear or non-linear transformation. The method can sort entries in the code vector based at least in part on a predetermined ordering scheme. The method can further execute a random modification to each of the sorted entries. The method can compare the code vector to at least one other code vector associated with at least one second computing device. The method can determine a distance between the code vector and the at least one other code vector. The method can also determine, based on the determined distance, whether the computing device and the at least one second computing device were in proximity to each other during a time period corresponding to the time information.

In accordance with other example embodiments of the disclosure, a system is disclosed for encrypting location data associated with a computing device into a code vector to hide the location data. The system can include a database, a mobile computing device, and one or more servers. The computing device can execute an application to convert time and location information associated with the location data of the mobile computing device into a vector format; generate the code vector based on the converted time and location vector using a linear or non-linear transformation; sort entries in the code vector based at least in part on a predetermined ordering scheme; execute a random modification to each of the sorted entries; and transmit the code vector to the one or more servers. The one or more servers can be programmed to compare the code vector to at least one other code vector associated with at least one second computing device; determine a distance between the code vector and the at least one other code vector; and determine, based on the determined distance, whether the computing device and the at least one second computing device were in proximity to each other during a time period corresponding to the time information.

In accordance with example embodiments of the disclosure a device for encrypting location data associated with a computing device into a code vector to hide the location data is disclosed. The device comprises at least one non-transitory computer-readable medium storing computer-executable instructions therein, which when executed by at least one processor, cause the at least one processor to perform the following operations. The at least one processor can convert time and location information associated with the location data of the computing device into a vector format. The at least one processor generates the code vector based on the converted time and location vector using a linear or non-linear transformation. The at least one processor sorts entries in the code vector based at least in part on a predetermined ordering scheme. The at least one processor executes a random modification to each of the sorted entries. The at least one processor compares the code vector to at least one other code vector associated with at least one second computing device. The at least one processor determines a distance between the code vector and the at least one other code vector. The at least one processor also determining, based on the determined distance, whether the computing device and the at least one other computing device were in proximity to each other during a time period corresponding to the time information.

Embodiments of the present disclosure relate to systems and methods for hiding data to provide improved and enhance data privacy and security. That is, instead of disclosing a data value x, embodiments of the present disclosure can disclose an "encrypted" version of x, namely E(x), where E(x) is easy to compute but very difficult, from a computational point of view, to invert. Embodiments of the present disclosure can guarantee perfect recall. For example, for embodiments of the present disclosure that can be utilized for contact tracing, the systems and methods can guarantee that all individuals (having their locations monitored) who have potentially been exposed to infection are alerted, while incurring an infinitesimal number of false alarms, namely, only a negligible number of individuals who have not actually been exposed may be wrongly informed that they have.

In accordance with embodiments of the present disclosure, systems, methods, and non-transitory computer-readable media are disclosed. The non-transitory computer-readable media can store instructions for execution by one or more processing device to hide data from users while maintaining a relative relationship between each of the users' data. The one or more processing devices can reside in one or more device, such as mobile devices (e.g., mobile phones, tablets, smart watches, laptops, etc.), servers, personal computers, and/or any other suitable devices. The instructions can be executed by the one or more processing devices to implement a data hiding process that can include converting time and location information associated with the mobile devices into a vector format. The data hiding process can further include generating a code word based on the converted time and location information vector. The data hiding process can further include sorting entries in the code word based on a predetermined ordering scheme. The data hiding process can further include executing a random modification to each of the sorted entries.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

FIG. 7 is a table showing a comparison of attack complexity resulting from different values of parameters in accordance with embodiments of the present disclosure.

DETAILED DESCRIPTION

Figure 1:
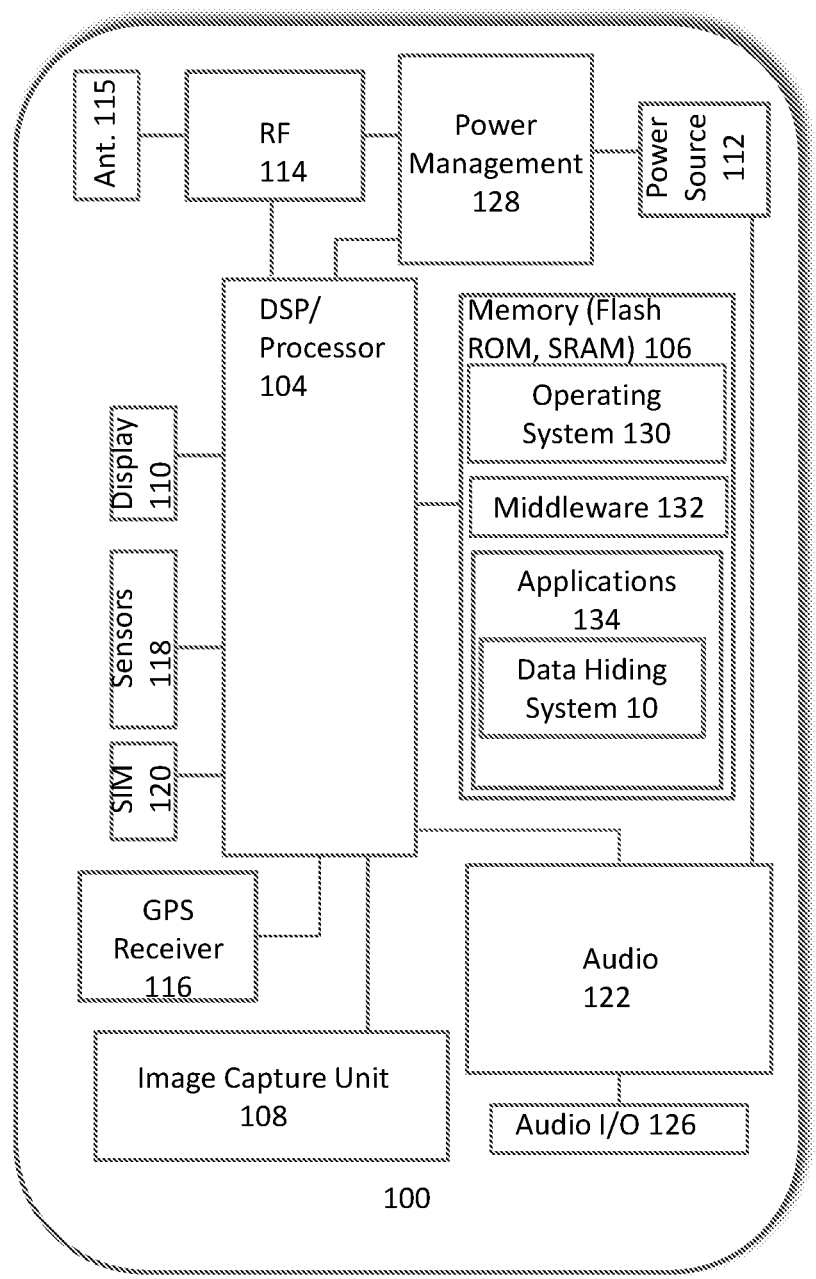
FIG. 1 is a block diagram of a mobile computing device in accordance with embodiments of the present disclosure.

Embodiments of the present disclosure are related to systems and methods for hiding data in a computing environment using a data hiding process that obscures the location history, or path(s) that a user has traversed, by encrypting time and location data generated by a device carried by the user. Embodiments of the present disclosure can preserve the privacy of users providing data to the systems. For example, time and location data from mobile computing devices can be processed by the data hiding process to encrypt or encode the time and location information associated with the mobile computing device to hide the time and location information while maintaining a relative relationship between the time and location information.

As a non-limiting example, embodiments of the present disclosure can be utilized for contact tracing, which has proven to be an effective tool in controlling the spread of infectious diseases, such as COVID-19, but has gain limited acceptance in view of data security and privacy concerns. Contact tracing involves digital monitoring and recording of physical proximity between people over time, so that when one user reports infection, it is possible to identify all other users who have been in close proximity to that person during a relevant time period in the past and alert them. These users would be required to monitor their health and isolate, allowing early treatment and preventing further spread. Contact tracing has been deployed successfully in countries such as China, South Korea, Singapore, Israel, Australia, and Germany.

There are two main approaches to contact tracing. The first is based on the relative distance between users. Using the Bluetooth sensor on a smartphone, it is possible to detect signals from other users with Bluetooth emitters who are physically close by (i.e., within a certain range) and record the proximity, either locally on the user's device, or at a central authority/server. This method, currently under development by Apple, Google and others, has the advantage that absolute locations of users are never disclosed, ensuring some degree of privacy. The disadvantage is the reliability of the Bluetooth sensors and their ability to work well under all relevant conditions (e.g., occlusion) and at all relevant ranges and some security concerns about the popular decentralized approach to storing this type of data on user devices.

The second approach to contact tracing involves recording on a central server the absolute locations, e.g., by reading and reporting the GPS coordinates of a smartphone, of all users over time. This obviously provides the server with more information to work with than the first approach, enabling not only alerts to nearby users, but also to identify geographic hotspots and other patterns of contagion. It also provides a historic record of the evolution of an epidemic which can be mined and analyzed in many other ways.

Despite the simplicity of the second approach, privacy concerns have prevented its widespread adoption. Many people do not want their location history to be known to any third party, thus would avoid using any software that explicitly discloses this information. Some have gone so far as to call contact tracing based on unprotected disclosure of location data illegal or unconstitutional. A number of commercial contact tracing apps, which report and store explicit location data, have recently been found in violation of user privacy policies, having shared this data with unauthorized third parties. Such privacy concerns must be addressed if automatic contact tracing is to be deployed, as it is not very effective if not adopted by a majority of the population.

Technology that would enable the "hiding" or "obfuscation" of location data could go a long way towards alleviating privacy concerns and enabling contact tracing at a very large scale. Since the outbreak of COVID-19, this has been the topic of recent research, incorporating cryptographic techniques such as private set intersection and private proximity testing based on an equality testing protocol.

While an example embodiment of the present disclosure is described herein relative to an application for contact tracing, exemplary embodiments can be implemented in other application where the data hiding process is applicable.

Embodiments of the present disclosure can provide systems and methods to hide data, which can also be used to hide spatio-temporal data. Instead of disclosing a data value x, embodiments of the present disclosure can hide data by having a user disclose an "encrypted" version of x, namely $E(x)$. For this to be useful, it should be easy for any user to compute $E(x)$ if given x, but be very difficult, from a computational point of view, to invert E, namely to recover x when provided only with $E(x)$ (even for the user who encrypted x). For example, the inversion of E to recover x should require a prohibitive amount of storage or of computational resources, which can effectively deter any attempts at recovering x. These resemble one-way functions or cryptographic hash functions used in classical cryptography. In its simplest form, the function E is deterministic and injective, as then it is easy to check if x=y by simply checking if E(x)=E(y). In the contact-tracing scenario, the data x=(t, l) is a data value consisting of a concatenation of the time t with the location l. Given the function E, a user with ID i would periodically transmit to a central server the pair (i, e), where e=E(x) is the encrypted version of x. The server would store these pairs in a database indexed by the second component. Given a query vector e (of a detected infection), it should be easy to search this database to determine all pairs (i', e') such that e'=e, namely identify which other users (having ID i') were also at location l at time t and alert them.

Embodiments of the present disclosure depart from traditional cryptographic techniques by not requiring the use of encryption keys of any sort, neither private nor public keys. This means that even the user who computed E(x) from x cannot recover x from E(x) unless she explicitly records the connection between the two or stores some additional information which might help in the recovery. While an embodiment of E can be deterministic, embodiments can add an extra layer of security by introducing a non-deterministic (probabilistic) element to E, namely E(x) could assume more than one value for any given x. For embodiments in which a non-determinist element is introduced, the database search can use a matching procedure: given a query e, instead of searching for other vectors e' such that e=e', we search for all other vectors e' such that $\delta(e, e') \leq \tau$, where $\delta$ is the Hamming distance function between two vectors, namely the number of coordinates in which they differ, and $\tau$ is some threshold. These e' are called matches of e. An exact match is, of course, the special case where $\tau=0$. A judicious choice of the encryption function E and the value $\tau$ can guarantee no false negatives (i.e. perfect recall), namely, given a query e corresponding to some data x, all other matching values e' corresponding to the same x can be returned. A judicious choice of the encryption function E and the value $\tau$ can also guarantee a negligible (ideally zero) number of false positives (also called false alarms), namely, almost never report values e' corresponding to a different data value $y \approx x$. In the contact tracing scenario, perfect recall can be necessary so that all individuals who have potentially been exposed to infection can be alerted. A small number of false positives can be tolerated.

In some embodiments, encryption functions for spatiotemporal data are proposed. The encryption functions map a 2D location l (e.g., longitude and latitude) and time t, combined and represented as a large integer in a discrete world, to an n-dimensional vector of integers E(x), where n is large, e.g., on the order of 100. The range of the components of E(x) can be much larger than n, e.g. $\{0, \ldots, 502\}$. The function E can be based on number-theoretic techniques, which, in some embodiments, can make use of polynomials over finite fields. An important property of E can be that E transforms a very large integer into a long vector of much smaller integers in an injective way, which can be thought of as an embedding in a higher-dimensional space, and this transformation cannot be inverted unless a minimal number $m \leq n$ of the vector coordinates (and their indices in the vector) are known. Embodiments of the present disclosure can sort the vector coordinates so that their correspondence to the coordinate indices is lost, making it difficult to apply standard decoding methods. An attacker has no choice but to try all possible permutations of subsets of size m of the n coordinates, making it computationally infeasible, even for relatively small values of n and m. Another important property is that, although there are simple algebraic relationships between the coordinates of the vector, to the naked eye, and even to a statistical test, the coordinates of the vector appear to be random integers. Thus, the distribution of the encrypted vectors in the embedding space is advantageously quite uniform.

FIG. 1 is a block diagram of a mobile computing device 100 that can be utilized to implement embodiments of tracing data hiding system 10 of components thereof. As a non-limiting example, the data hiding system can be implemented as a contract tracing system. The mobile computing device 100 can be a user device in the form of a smartphone, tablet, subnotebook, laptop, personal digital assistant (PDA), and/or any other suitable mobile computing device that can be programmed and/or configured to implement embodiments of the present disclosure. The mobile computing device 100 can include a processing device 104, such as a digital signal processor (DSP) or microprocessor, memory/storage 106 in the form a non-transitory computer-readable medium, an image capture unit 108, a display unit 110, a power source 112, an radio frequency transceiver 114, a global positioning system (GPS) receiver 116. Some embodiments of the mobile computing device 100 can also include other components commonly, such as sensors 118, subscriber identity module (SIM) card 120, audio components 122 and 126, and power management circuitry 128.

The memory 106 can include any suitable, non-transitory computer-readable storage medium, e.g., read-only memory (ROM), erasable programmable ROM (EPROM), electrically-erasable programmable ROM (EEPROM), flash memory, and the like. While memory is depicted as a single component those skilled in the art will recognize that the memory can be formed from multiple components and that separate non-volatile and volatile memory device can be used.

In exemplary embodiments, an operating system 130, middleware 132, and applications 134 can be embodied as computer-readable/executable program code stored on the non-transitory computer-readable memory 106 and implemented using any suitable, high or low level computing (programming or scripting) language and/or platform, such as, e.g., Java, C, C++, C#, Ruby, Python, JavaScript, assembly code, machine readable language, and the like. In some embodiments, the applications 134 can include the data hiding system 10 or components thereof as well as other applications, such as a web browser application. Middleware 132 and/or applications 134 including embodiments of the data hiding system 10 can be downloaded to and installed on the mobile computing device 100 from one of more sources (e.g., app marketplaces, such as Google Play, Amazon AppStore, Apple AppStore, etc.).

The middleware 132 enables communication and management of data between the mobile computing device 100 executing an instance of the data hiding system 10 and one or more servers of a remote computing system. For example, the mobile computing device 100 and a server application implemented by one or more servers can implement the data hiding system 10 as a distributed application, where the mobile computing device 100 implements an instance of the data hiding system 10 and the server application implements an instance of the data hiding system 10. The middleware 132 can coordinate and synchronize the execution of the instances of the data hiding system 10 on the mobile computing device 100 and the server. While the middleware 132 and the data hiding system 10 are illustrated as being separate and distinct, in exemplary embodiments, the middleware 132, or its functionality, can be incorporated in or integrated with the system 10. The digital signal processor (DSP)/processor 104 can include any suitable single- or multiple-core microprocessor of any suitable architecture that is capable of implementing and/or facilitating an operation of the mobile computing device 100. For example, perform one or more operations associated with the data hiding system 10 described herein. The processing device 104 can retrieve information/data (e.g., user profile information, time data, location data, etc.) from and store information/data to the memory 106. The data hiding system 10 or components thereof can be executed by the processing device 104 to perform a data hiding process described herein.

The RF transceiver 114 can be configured to transmit and/or receive wireless transmissions via an antenna 115. For example, the RF transceiver 114 can be configured to transmit data/information, such as time and location information or encrypted time and location, directly or indirectly, to one or more servers and/or to receive data/information, such as one or more images and/or user profile information, directly or indirectly, from one or more servers. The RF transceiver 114 can be configured to transmit and/or receive information having a specified frequency and/or according to a specified sequence and/or packet arrangement.

The GPS receiver 116 can be configured to receive GPS satellite transmissions including GPS data, which can be used by the processor 104 of the mobile computing device 100 to monitor and/or track a geographic location of the mobile computing device 100 (e.g., a longitude and latitude of the mobile computing device 100). For example, the mobile computing device 100 can receive a broadcast signal from a GPS satellite and can process the GPS data included in broadcast signal to determine a geographic location of the mobile computing device 100, which can be utilized by identify a group of users that are within a specified geographic radius of the mobile computing device 100 at a given time.

The display unit 110 can render user interfaces, such as graphical user interfaces to a user and in some embodiments can provide a mechanism that allows the user to interact with the GUIs. For example, a user may interact with the mobile computing device 100 through display unit 110, which may be implemented as a liquid crystal touch-screen (or haptic) display, a light emitting diode touch-screen display, and/or any other suitable display device, which may display one or more user interfaces that may be provided by the data hiding system 10 in accordance with exemplary embodiments.

The power source 112 can be implemented as a battery or capacitive elements configured to store an electric charge and power the mobile computing device 100. In exemplary embodiments, the power source 112 can be a rechargeable power source, such as a battery or one or more capacitive elements configured to be recharged via a connection to an external power supply.

The data hiding system 10 or components thereof can be executed by the processing device 104 to perform a data hiding process as described herein. The data hiding process performed in response to the execution of the data hiding system 10 can encrypt a time and location associated with mobile computing device 100. The data hiding system 10 can define an integer domain (the "world"): W={0, . . . , M−1}. Any integer x∈W is a valid message and can be expressed as a sequence of m digits x=(x$_1$, . . . , x$_m$) in base $$p: x = \sum_{k=0}^{m-1} x_i p^i$$

where p is a prime number (or more generally a prime power) and $x_i \in \mathbb{Z}_p = \{0, \ldots, p-1\}$. Note that this implies that m=[log$_p$M] and taking a larger m is superfluous. Essentially, W is synonymous with a subset of $\mathbb{Z}_p^m$, the set of all vectors of length m, where each coordinate is taken from $\mathbb{Z}_p$.

For embodiments in which the data hiding system 10 is utilized for contact tracing, the spatio-temporal world can include two-dimensional (latitude and longitude) GPS coordinates at 1 meter resolution (or the Open Location "Plus" Codes), which translates to a grid with $10^{14}$ points, and $10^5$ different time stamps for every 30 seconds over a past month, implying a "world" of size M=$10^{19}$. If the prime p=503 is used, m would equal 8.

Figure 2:
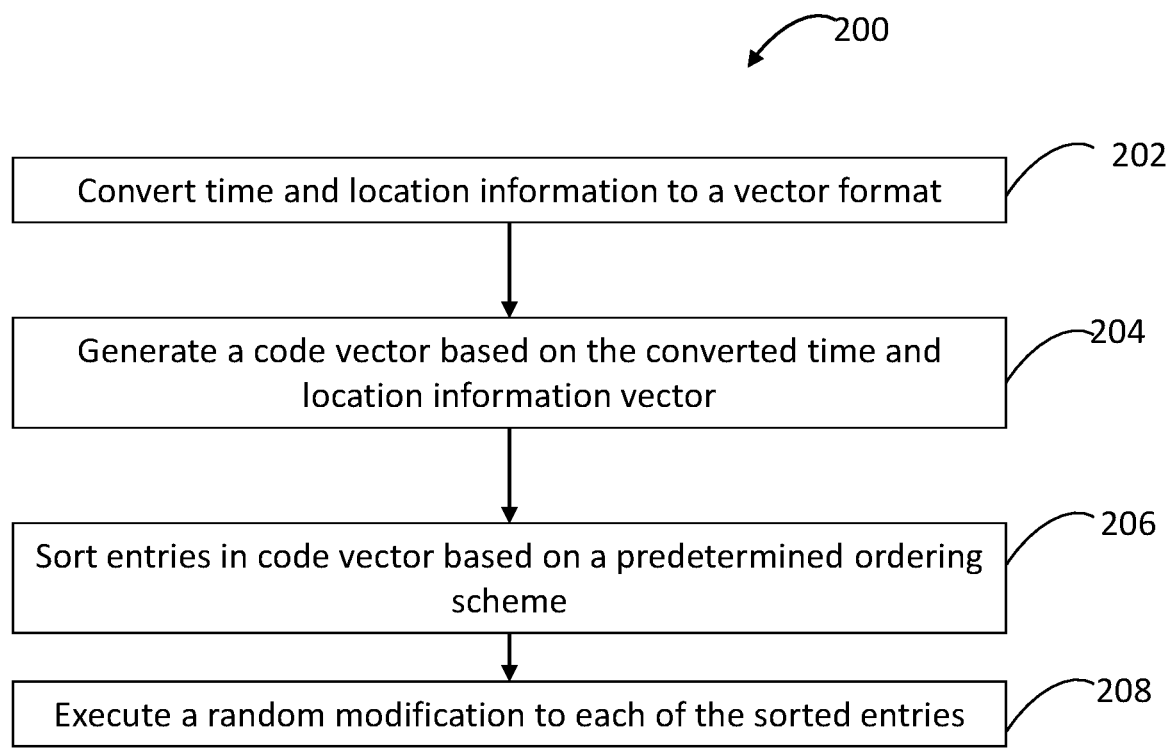
FIG. 2 is an exemplary flowchart depicting a process of hiding a data/information in accordance with embodiments of the present disclosure.

FIG. 2 is an exemplary flowchart depicting an embodiment of a data hiding process 200 for encrypting or encoding data/information to hide or mask the data/information in accordance with an exemplary embodiment. The operations of process 200 can be implemented by mobile computing device 100. More specifically DSP/processor 104 can execute instructions associated with tracing data hiding system 10 described with reference to FIG. 1 to implement operation 202, 204, 206, and 208, respectively. While FIG. 2 is described using time and location data to illustrate the operation of the data hiding process, exemplary embodiments of the data hiding process can be implemented to hide other types of data.

At operation 202, time and location tuple t and l data expressed as x=(t, l) can be converted into a vector format. In some embodiments, this vector format are the digits corresponding to representation in base of p. That is, in order to compute E(x) for a domain element x∈W: first x is expressed in base $$p: x = \sum_{k=0}^{m-1} x_i p^i, x = (x_0, \ldots, x_{m-1}).$$

At operation 204, a code word can be generated based on the vector x using a polynomial function. This can be accomplished by, for example, selecting an integer value ξ, raising it to an integer power i, and multiplying it by x$_i$. This is then summed over all i from 0 to m−1. The result is then the residue of this value modulo p. A vector can be created based on multiple integer values for ξ. This can be expressed as C(x)=(π(0), . . . , π(n−1))∈ $\mathcal{C}$ ⊂ $\mathbb{Z}_p^n$, where $$\pi(\xi) = \sum_{k=0}^{m-1} x_i \xi^i$$

(mod p) is a polynomial of degree m−1 over the finite field $\mathbb{Z}_p$.

At operation 206, the entries in vector C(x) can be sorted in accordance with a predetermined ordering scheme in such a way that they arranged in a non-decreasing order such that the result is C'(x)∈ $\mathcal{E}$.

At operation 208, k entries in C'(x) are randomly selected and modified, while preserving the increasing order of the coordinates, resulting in E(x)∈ $\mathcal{E}$. It should be noted that k>0 implies that E(x) is non-deterministic, namely may assume multiple values. It should also be noted that k<n where n corresponds to the number of entries in C'(x). The number k can be randomly selected based on a random number generator whose distribution is based on noise generated by a processor executing instructions associated with the process 200, or any other processes described herein. The actual k entries that are selected can be selected at random in accordance with a predetermined distribution (e.g., a uniform distribution).

After E(x) has been generated, process 200 can end.

The basic code space $\mathcal{C} \subset \mathbb{Z}_p^n$, defined as the set of all possible codes of world elements $\mathcal{C} = \{C(x): x \in W\}$ consists of vectors of length n, such that $C_i(x) \in \mathbb{Z}_p$. It has the following properties: C(x) is injective, namely x=y iff C(x)=C(y). $\mathcal{C}$ has Hamming distance d=n−m+1, namely any two distinct codewords $c_1, c_2 \in \mathcal{C}$ differ from each other by at least d coordinates: $\delta(c_1, c_2) \geq d$. This is because any polynomial of degree m−1 over a field is uniquely determined by m of its values. So not only is C an injective function (i.e. d>0), but it maps distinct world elements quite far apart from each other in $\mathcal{C}$. The value of x may be recovered from C(x) by a variety of efficient methods, including inverting a linear Vandermonde system.

The basic coding function C described above was proposed by Reed and Solomon as an error-correcting code to overcome corruption of k=[d/2] coordinates of C(x). When presented with c', which is a corrupted version of C(x), Property 2 guarantees that C(x) is the unique codeword in $\mathcal{C}$ such that $\delta(C(x), c') \leq k$, thus error-correction performed by replacing c' with the vector closest to it in $\mathcal{C}$ by the Hamming distance, is well-defined and yields the correct result C(x). The corrected codeword C(x) may be found by efficient algorithms which take into account the special algebraic structure of $\mathcal{C}$.

The non-deterministic encryption function E(x) is a variation on the theme of error-correction. In our scenario, we are presented with two vectors E(x), E(y)$\in \mathcal{E}$ originating from x, y∈W. We would like to have a threshold τ such that x=y iff $\delta(E(x), E(y)) \leq \tau$.

Incorporating the sorting operation 206 complicates analysis and identification of k and τ, it also enhances the security of the encryption E(x), namely, the sorting step makes recovery of x from E(x) more difficult than if sorting was not applied. This would be essentially error-correction from k errors, which, as mentioned above, is possible by a number of efficient algorithms, taking advantage of the special algebraic structure of $\mathcal{C}$.

The advantage of introducing sorting operation 206 is that sorting prevents the use of the standard error-correction algorithms, since the critical correspondence between the coordinates of C'(x) (and thus of E(x)) and the indices in the original C(x) is lost as a result of the sorting.

A disadvantage of introducing sorting operation 206 is that it modifies the Hamming distance d present in $\mathcal{C}$, which is not likely to be preserved in $\mathcal{C}'$ and $\mathcal{E}$. In theory, sorting can increase the distance, but it is much more likely to decrease the distance. It can be difficult to obtain a lower bound on this distance, since the algebraic structure that was present in $\mathcal{C}$ has been destroyed in the transition to $\mathcal{C}'$ and $\mathcal{E}$.

While applying sorting, the data hiding system 10 can still make useful observations about the nature of the encrypted vectors in $\mathcal{E}$. To the naked eye, the basic code space $\mathcal{C}$ consists of integer vectors of essentially pseudo-random values in the range $\{0, \ldots, p-1\}$. While the vectors are completely determined by x, it will be statistically impossible to distinguish between these vectors and completely random vectors. The sorting of the vectors can make the vectors less random, but it can still be quite difficult to distinguish between the vectors in $\mathcal{E}$ and random non-decreasing integer vectors.

Figure 3:
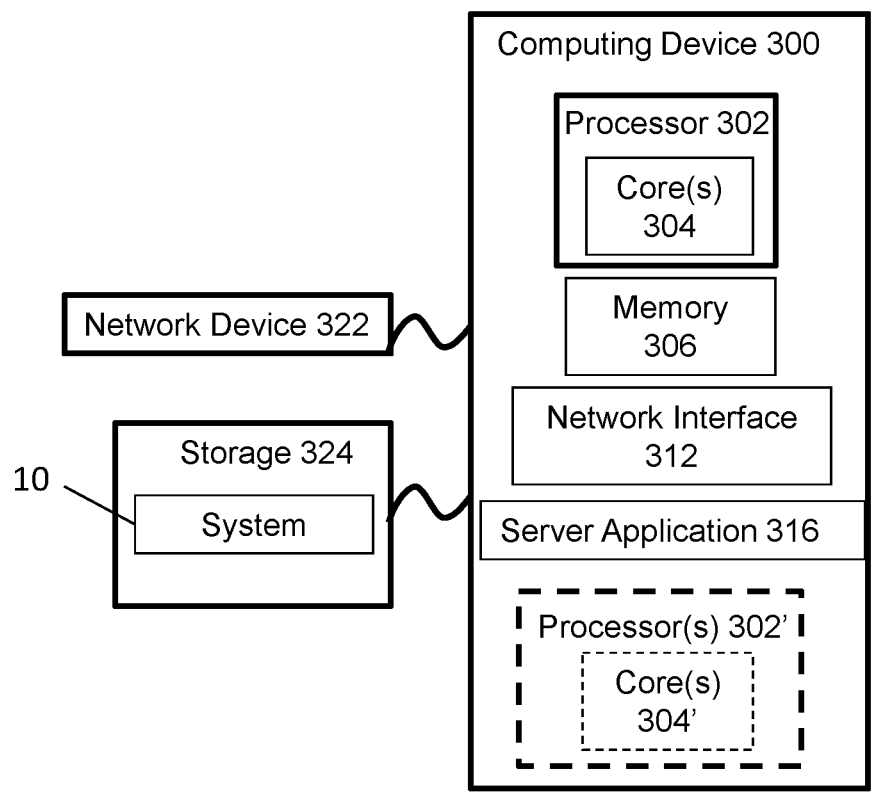
FIG. 3 is a block diagram of an exemplary computing device that can be utilized to implement a server in accordance with exemplary embodiments of the present disclosure.

FIG. 3 is a block diagram of an exemplary computing device 300 that can be utilized to implement embodiments of the data hiding system 10 or portions thereof. In the present embodiment, the computing device 300 is configured as a server that is programmed and/or configured to execute one or more of the operations and/or functions of the data hiding system 10 and to facilitate communication with mobile computing devices, such as embodiments of the mobile computing device 100. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of the data hiding system 10 or portions thereof.

The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Memory 306 may include a computer system memory or random access memory, such as DRAM, SRAM, EDO RAM, and the like. Memory 306 may include other types of memory as well, or combinations thereof.

The computing device 300 may also include one or more storage devices 324, such as a hard-drive, CD-ROM, mass storage flash drive, or other computer readable media, for storing data and computer-readable instructions and/or software that can be executed by the processing device 302 to implement exemplary embodiments of the data hiding system 10 described herein.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. While the computing device 300 depicted in FIG. 3 is implemented as a server, exemplary embodiments of the computing device 300 can be any computer system, such as a workstation, desktop computer or other form of computing or telecommunications device that is capable of communication with other devices either by wireless communication or wired communication and that has sufficient processor power and memory capacity to perform the operations described herein.

The computing device 300 may run any server application 316, such as any of the versions of server applications including any Unix-based server applications, Linux-based server application, any proprietary server applications, or any other server applications capable of running on the computing device 300 and performing the operations described herein. An example of a server application that can run on the computing device includes the Apache server application.

Server application 316 may also be executable software that implements the server side computations associated with the data hiding process of embodiments of the data hiding system 10 described herein. The server application 316 can receive and store data/information from the mobile computing device and/or can receive encrypted data/information. For example, the server application 316 can receive an encrypted version of data from mobile computing device 100 corresponding to time and location data/information, along with an identifier associated with mobile computing device 100. That is, server application 316 may receive $e=E(x)$, and user ID i and store the tuple (i, e) in either memory 306 or storage 324.

For embodiments related to contact tracing, the server application 316 can be executed by the processing device 302 or 302' to perform a matching algorithm to determine when the user of computing device 100 has come into close proximity of a user of another mobile computing device at a given time or over a given time period. For a database of D pairs of user ID's and encrypted spatio-temporal values: $\{(i, E(x)): i=1, \ldots, D\}$, and given the query—a vector e—we wish to find all matches of e, namely, find all database entries $\{(i, e')\}$ such that both e and e' are possible encryptions of the same data value x, i.e. $\delta(e, e') \leq \tau$ for a suitable threshold $\tau$. We say that $\tau$ is the matching threshold and e' matches e.

Continuing with the contact tracing example, the size of the world is $M=|W|=10^{19}$. Assuming 1 billion=$10^9$ users, each storing location data for every 30 seconds over the past month, namely, close to $10^5$ time-stamped locations, this implies that the database could contain $D=10^{14}$ entries.

In the contact tracing example, a matching threshold of $\tau=2k$ can be a "reasonable" value. This is because the size of the database (D) is much smaller than the size of the world (M), thus the probability that database vectors match a typical query vector is infinitesimally small, unless they are encryptions of the same world data.

As $D \ll M \ll N$, where $M \approx p^m$ and $N=p^n$, if given a query $e=E(x)$ for which there exists a matching database entry e', then obviously $\delta(e, e') \leq 2k$. So to avoid false negatives, namely, to avoid missing correct matches, the threshold can be set to be greater than or equal to this ($\tau \geq 2k$).

In some embodiments, a given query vector $e=E(x)$ may "accidentally" match a vector $e'=E(y)$ corresponding to another $y \neq x$ in the database because of the sorting and corruption of the original residue code vectors in $C$. However, this possibility, can be ruled out if the following theorem is assumed which would imply that a false positive is highly unlikely.

Theorem 1: Given any $e \in \mathcal{E}$, an upper bound for the probability of a vector $e' \in \mathcal{E}$, generated by sorting the coordinates of a random vector $z \in \mathbb{Z}_p^n$, differing from e in at most $\tau$ non-adjacent coordinates is $$Prob\ \{\delta(e, e') \leq \tau\} \leq s(p, n, \tau) = \frac{n!}{p^n} \cdot \sum_{d=0}^{\tau} \frac{(2p)^d}{d!}.$$

This can be proven given the following. For the case $\tau=0$, the probability of an exact match in all coordinates is at most $n!/p^n$, since all n! permutations of e can be taken as z among all $p^n$ possible unsorted vectors in $\mathbb{Z}_p^n$, such that $\delta(e, e')=0$. For every coordinate of e that occurs with multiplicity $\mu>1$, the probability reduces by a factor of $\mu!$, because the order of the repeated coordinate in z does not matter.

For the case $\tau=1$, the number of sorted vectors $e' \in \mathcal{E}$ that differ from e in exactly one coordinate can be studied. Letting $e_0=0$ and $e_{n+1}=p-1$, each coordinate $e'_i$ of e' for $i=1, \ldots, n$ can take any value in $\{e_{i-1}, \ldots, e_i-1, e_i+1, \ldots, e_{i+1}\}$ without compromising the correct order. Hence, there are $\Sigma_{i=1}^n(e_{i+1}-e_{i-1})=p-1+e_n-e_1 \leq 2p-2 \leq 2p$ sorted vectors $e' \in \mathcal{E}$ at distance $\delta(e, e')=1$ from e and thus the number of sorted vectors $e' \in \mathcal{E}$ with $\delta(e, e') \leq 1$ is at most $2p+1$. Using the same permutation argument as before, this proves the upper bound for $\tau=1$.

For the case $\tau>1$, the previous argument can be applied iteratively $\tau$ times while using the assumption that the coordinates of e' that differ from those of e are non-adjacent. Then a vector at distance $\tau+1$ is just a modification of a vector at distance $\tau$ in one additional coordinate, thus the number of modifications is at most $(2p)^\tau$. This is an overestimate as a modification may occasionally reduce the distance by one. Since the order of modification of the modified coordinates is not important, each distinct modification has been counted $\tau!$ times.

The assumption that the differing coordinates of e and e' are non-adjacent makes the proof of Theorem 1 easier, but experimentally it has been observed that this upper bound holds also for the unrestricted case. So, the expected number of false positives for any given query e is at most $Ds(p, n, \tau)$, which decreases as $\tau$ decreases. For the values $p=503$, $n=100$, $k=10$ can be used and matching threshold can be $\tau=20$, thus $s(p, n, \tau) \approx 10^{-71}$. Since $D=10^{14}$, the expected number of false positives per query is infinitesimal ($10^{-57}$), and even the expected number of false positives when each database entry is used as a query is still only $D^2s(p, n, \tau)=10^{-43}$.

In some embodiments, an efficient data matching retrieval system is disclosed. After a suitable matching threshold for the matching algorithm is established, the database of D encrypted values (which are sorted integer vectors) can be organized in such a way that given a query vector e, it is possible to efficiently find all pairs (i', e') in the database such that e' matches e, namely such that $\delta(e, e') \leq \tau$. This is known as the "static Hamming distance range query". An exhaustive search of the database is possible, but that would cost O(D) time, which is too costly in our scenario where $D=10^{14}$.

In some embodiments, a tracing algorithm is also disclosed to trace the interactions of the user of computing device 100 with other users of mobile computing devices that were within the vicinity of the user of mobile computing device 100.

In order to perform the contact tracing algorithm, computing device 100 continuously transmits to the server data pairs (i, e) where $e=E(x)$ and $x=(t, l)$ is her time and location, tagged as "uninfected". The computing device 100 also stores the triples (t, l, e) in a local database indexed by t and e (e.g. on her smartphone), so that it is easy to retrieve all e's transmitted during a given time interval and recover (t, l) from its encryption e.

If the user discovers she is infected, she sends again all pairs (i, e) generated by her over the past, say, two weeks (by querying her local database) back to the server, tagged as "infected".

Upon receipt of message e tagged with "possible infection" from the computing device 300, the user recovers the infection time and location (t, l) from e (by querying her local database). The user self-isolates for two weeks and can possibly report (t, l) separately to friends and family.

Figure 4:
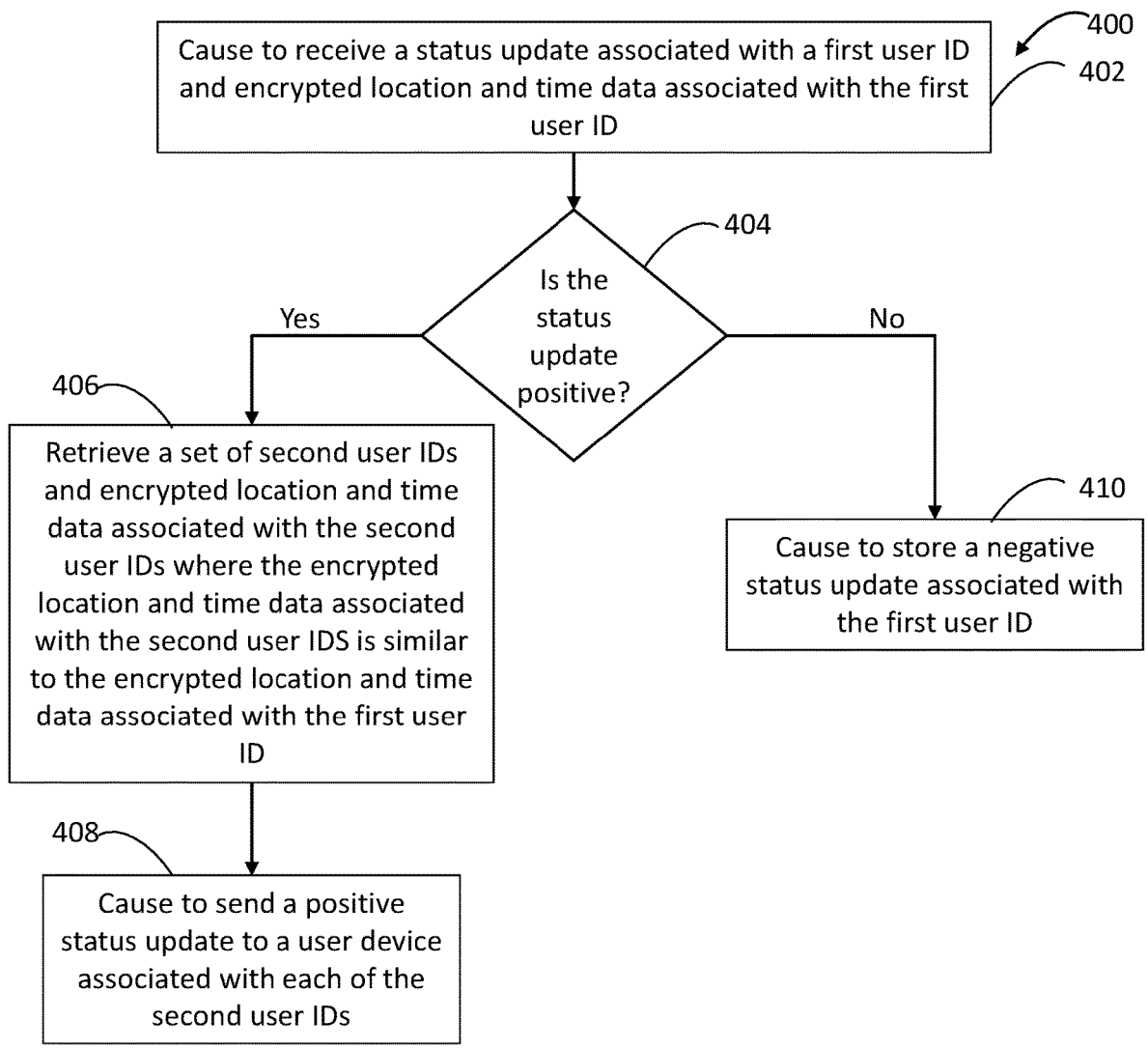
FIG. 4 illustrates an exemplary flowchart depicting a process of notifying a user that they were in the vicinity of another user in accordance with embodiments of the present disclosure.

FIG. 4 illustrates an exemplary flowchart depicting a process 400 of notifying a user that they were in the vicinity of another user in accordance with embodiments of the present disclosure. The operations of process 400 can be implemented by a server such as computing device 300. More specifically processor 302 and/or processor(s) 302' can execute instructions associated with performing the matching process as described above, and notifying a user if they have come into proximity of another user who has a status identifier of "infected". Processor 302 and/or processor(s) 302' can execute instruction that cause processor 302 and/or processor(s) 302' to implement operation 402, 404, 406, 408, and 410 respectively.

At operation 402, the process can cause to receive a status update associated with a first user ID and encrypted location and time data associated with the first user ID. For instance, the computing device 300 can receive a status update corresponding to one or more health metrics associated with the first user, and also receive the encrypted location and time data associated with the first user's travels over a period of time. Based on the status update, the process can proceed to operation 404.

At operation 404, the process can determine whether the status update is positive or negative. In some embodiments, a status update of positive can correspond to the first user being ill and infected by one or more viruses or bacteria. If the process determines that the status update is positive, the process progresses to operation 406.

At operation 406, the process retrieves a set of second user IDs and encrypted location and time data associated with the second user IDs, where the encrypted location and time data associated with the second user IDS is similar to the encrypted location and time data associated with the first user ID. For example, upon receipt of a pair (i, e) tagged "infected", the computing device 300 retrieves from the server database (by the matching algorithm described above) all pairs (i', e') for which e' matches e. The computing device 300 then sends these e' to user i' tagged with "possible infection". At operation 408, the process can send a positive status update to a user device associated with each of each of the second user IDs.

If the process determines that the status update is negative, the process can progress to operation 410, where the process can cause to store a negative status update associated with the first user, in the server database. A negative status update can correspond to an uninfected user. Upon receipt of a data pair (i, e) tagged "uninfected", the computing device 300 stores the pair on the server database (of size D).

In some embodiments, process 200 and/or process 400 described above, can be executed by computing device 300, where a mobile computing device (e.g., mobile computing device 100) transmits the vector x to computing device 300, and computing device 300 performs the steps in process 200.

An objective is to "hide" the data by its encryption, namely render it computationally infeasible to recover the (large) integer $y \in W$ from the integer vector $e = E(y) \in \mathcal{E}$, either because it would require too much computation time or too much storage space. There are three possible methods that can be used to ensure the infeasibility of recovery.

The simplest method is just to exhaustively scan the entire world using a brute force attack method, and check if the encrypted version $e' = E(x)$ of any world point x matches the given encryption e (namely, that $\delta(e, e')$). This would require $|W| = M = 10^{19}$ encryptions and comparisons, which is prohibitive in runtime.

Alternatively, the runtime of the brute-force attack can be reduced by trading off space for time and employing a very large database. By simply computing some encryption E(x) for every possible $x \in W$ in a preprocessing phase and storing the pairs (x, E(x)) in a database indexed by E(x), can reduce the runtime. Given an encryption e, the matching algorithm described above would then be able to quickly retrieve all matches of e. However, this requires a database of size $O(\tau nM)$ which is $$\frac{M}{D} = 10^5$$

times larger than the server database. For $M = 10^{19}$, $p = 503$, $n = 100$ and $\tau = 20$, this is at least $10^{21}$ bytes, and would be prohibitively large.

Direct attack occurs when an adversary tries to invert the encryption through a subset of the coordinates by applying the traditional decoding algorithms such as solving a linear Vandermonde system. This is foiled by the sorting of the coordinates of the vectors. Since inversion requires knowledge of the correspondence between coordinates and their indices for at least m uncorrupted coordinates, an attacker must perform a series of time-consuming computations. In some embodiments, in order to invert $e = E(x)$, each subset of coordinates, represented by the variable m, of n must be identified. This collection of subset of coordinates, is referred to as the different combination of coordinates. This can be expressed as $$\binom{n}{m}$$

subsets. Further still, in order to invert $e = E(x)$ each permutation of m indices of n, must be identified as well. There are a total of $$\frac{n!}{(n-m)!}$$

of such permutations. An attacker would then have to multiply e by an inverse of a sub-matrix of the Vandermonde matrix, consisting of the corresponding m rows from the full Vandermonde n×m matrix. That is, for each subset of m coordinates, and the permutation of each of the m coordinates, e is multiplied by the corresponding sub-matrix of the Vandermonde matrix comprising the corresponding m rows of the Vandermonde matrix. If the value of the resulting vector, x, is greater than or equal to M, the attacker would then need to compute $e' = E(x)$, and determine whether the distance between e and e' is less than a threshold value (i.e., $\delta(e, e') \leq \tau$). If this distance between the two vectors is less than the threshold value, then the attacker has successfully recovered x.

Each solve costs $\Omega(m)$ time. Should any of the selected subset of m coordinates be corrupted, the inner loop will run completely, costing $$\frac{n!}{(n-m)!}$$

solves. Since the probability that none of the m coordinates are corrupted is $$\left(1 - \frac{k}{n}\right)^m \approx \exp\left(-\frac{km}{n}\right),$$

the outer loop will terminate on the average after exp $$\left(\frac{km}{n}\right)$$

iterations and the inner loop will compute an expected number of $$\frac{n!}{2(n-m)!}$$

solves the last time it runs. Note that failure in one iteration due to one or more corrupted coordinates will not reveal which of the m coordinates are corrupted, so that there is no extra information that can help to choose a "better" set of m coordinates in the next iteration. In total, the expected number of solves for this attack would be $$\frac{n!}{(n-m)!} \exp\left(\frac{km}{n}\right).$$

For n=100 and p=503, we have m=8. With k=10, the expected number of solves is $10^{16}$, which would take too long.

In some embodiments, it is possible to use another method which is also employed in error-correcting coding and secret-sharing. This involves so-called redundant residue number systems. Originally proposed in the 1950's for efficient arithmetic computations on large integers, this technique was adopted for error-correction coding soon after and is also used in cryptography. The main difference between this method and the basic coding method described above based on polynomials is that now the basic code space is $\mathcal{C} = \mathbb{Z}_{p_1} \times \mathbb{Z}_{p_2} \times \ldots \times \mathbb{Z}_{p_n}$ instead of $\mathbb{Z}_p^n$ for a sequence of distinct primes $(p_1, \ldots, p_n)$.

Recall that the "world" is W={0, . . . , M−1}. Let $(p_1', \ldots, p_n')$ be a sequence of increasing primes and m an integer such that $$\prod_{i=n-m+2}^{n} p_i < M < \prod_{i=1}^{m} p_i,$$

Denote $$N = \prod_{i=1}^{n} p_i.$$

The encryption function E: W→$\mathcal{E}$ for a domain element x∈W, has parameters $(p_1, \ldots, p_n, k, n)$, where $p_i$ are primes and 0≤k≤n is an integer. The basic coding function is simply $C(x)=(x(\text{mod } p_1), \ldots, x(\text{mod } p_n))\in \mathcal{C}$. Similar to the case of polynomials over finite fields, the infamous Chinese Remainder Theorem guarantees that x can be recovered from any subset of m coordinates of C(x) along with their indices, so this code also has Hamming distance n−m+1, and error-correction may be done using a variety of methods taking advantage of the algebraic structure. The encryption proceeds as above, by sorting the coordinates of the basic code and corrupting a small subset without changing the order. Nothing else is changed.

Despite this approach actually being simpler to implement than the polynomial-based approach, it is less desirable due to m being more constrained as a function of the primes used. For example, for n=80, taking $p_i$ to be all the consecutive primes from 877 to 1,451 (having geometric mean 1,143) yields only m=7. An appropriate k would be 8, thus $\tau$=16. The probability of a false positive is then $10^{-58}$ and the complexity of the direct attack is $10^{13}$ (see FIG. 7, Table 1).

It is relatively easy to increase the security of the system, i.e. making a direct attack on the system more difficult. In the scenario described above, where $M=10^{19}$, we took n=100, p=503, implying m=8, thus the complexity of a direct attack is $10^{16}$. If instead n=100 and p=101, so that m=[$\log_{101} 10^{19}$]=10, the complexity would increase to $10^{20}$ (although we would have to take k=1 and $\tau$=2 to keep the probability of a false positive at $10^{-10}$), and if this were not enough, it can be further increased by increasing both n and p. See FIG. 7 (Table 1) for a comparison of the attack complexity resulting from different values of the system parameters. Increasing n obviously increases the (bit) size $n \cdot \log_2 p$ of the code C(x) and thus the size of the server database, but the same is true for the database of the "table" attack.

A common assumption for potential infection in the application of contact tracing is temporal persistence, i.e. continuous exposure for a significant amount of time (typically 15 minutes). Embodiments of the data hiding system 10 can detect and alert for contact at a specific point in time (and space) (e.g., that a computing device of a user was within proximity to the computing device or an infected user at a specific point in time) and/or can include a measure of temporal persistence to determine contact for a specific duration of time (e.g., for 15 minutes). In one embodiment, can be performed by the data hiding system 10 or a portion thereof executing as a client-side application. As a non-limiting example, exposure to infection for k consecutive time stamps can result in k alerts to the user, at which point the temporal persistence of these alerts can be determine and the user of the computing device can proceed accordingly.

The encryption method disclosed herein is non-deterministic, namely involves randomly corrupting a subset of k>0 coordinates in the sorted basic code vector. The advantage of a large k is that it increases the difficulty of a direct attack on the database, as described above. However, for certain values of the other system parameters, it may be possible to make do with a deterministic encryption method, namely k=z=0. In this case, matching a query vector within the server database reduces to exact vector match, which may be done easily by binary search on a table (of size D) of the database entries (i, e), sorted in lexicographic order of e.

The method outlined above can provide an easy way to determine whether x=y by comparing E(x) and E(y). Recall that x and y are taken from a discrete world, which are essentially samples of the true continuous world at some finite resolution grid. However, sometimes in data hiding (e.g., contact tracing) it is beneficial to also determine proximity beyond the grid resolution, either because of an increased radius of infection or simply because the accuracy of the measured location (typically taken from a GPS device) is much worse than the grid resolution and the chances of an exact match in measured location even when two users are within grid resolution, is very slim.

It would seem difficult to achieve this, since the encrypted vectors have a pseudo-random distribution and any spatio-temporal correlation between two data points would be "lost in encryption". The easy way to circumvent this is for the computing device to transmit to the central server encryptions of not just her current location, but also of the neighboring grid points, effectively "dilating" the data point. This would incur some overhead in storage and transmission costs on both client-side and server-side.

Reporting absolute locations has the advantage that the server can run analytics on the accumulated data, e.g. to detect spatio-temporal infection "hotspots" or other contagion patterns over time and space. However, this requires the server to access the unencoded (time, location) data vectors reported by the users after infection. To maintain user anonymity while permitting these analytics, the user, upon detecting infection, can additionally report via the client-side application to the server the unencoded data x (without the user ID i) using a separate protocol that guarantees anonymity of the sender.

The world size, in as described herein, is $M=10^{19}$ integers, which is very large, but constrains some of the parameters in our encryption scheme. In particular, the parameter m, if too small, could compromise the security against the direct attack, as described above. One way to rectify this would be to "inflate" the world by means of some function $f: W \to W'$ with $M=|W| \ll |W'|=M'$. This function $f$ should be injective and non-polynomial, so that it cannot be inverted easily at each individual coordinate. One possibility for such an $f$ is the following:

Let $q_i$ denote the i-th prime (i.e., $q_1=2$, $q_2=3$, etc.) and observe that the product of the first $m_0=16$ primes is a little larger than the size of our world. Hence, the first step is to map $x \in W$ to the residue code vector w.r.t. these 16 primes, namely compute $C(x)=(c_1, \ldots, c_{m_0})$ with $c_i=x \pmod{q_i}$. For the next step, let $$s_i = \sum_{j=1}^{i-1} q_j$$

denote the sum of the first i−1 primes (i.e., $s_1=0$, $s_2=2$, $s_3=5$, etc.) and let us map each $c_i$ to the $(s_i+c_i+1)$-th prime, giving the vector $C'(x)=c'_i, \ldots, c'_{m_0}$) with $c'_i=q_{s_i+c_i+1}$. Finally, $$f(x) = \prod_{i=1}^{m_0} c'_i$$

can be defined, and note that $f(x)$ is a square free integer with exactly $m_0$ prime factors. Moreover, as the mapping C is injective, it follows that $f(x)$ and $f(y)$ for $x \neq y$ have at most $m_0-1$ common factors, thus guaranteeing the injectivity of $f$. The size of the inflated world is $$M' = \prod_{i=1}^{m_0} q_{s_{i+1}} \approx 10^{39}.$$

Afterward, encrypt $x'=f(x) \in W'$ instead of $x \in W$ with the polynomial-based approach outlined above, but now having the advantage of a larger m'=15 instead of the previous m=8.

The basic code based on polynomials is a linear code, in the sense that the coding operation is just multiplication by a matrix: $C(x)=V \cdot x$ over $\mathbb{Z}_p$. V is the n×m Vandermonde matrix, which has the special property that all submatrices of size m×m have full rank. This property allows to recover x from any subset of m coordinates of C(x) by multiplying them by the inverse of the appropriate submatrix of V. Thus any n×m matrix with similar properties would serve the same purpose. Furthermore, to construct an n×m matrix A with the property that some of the submatrices of size m×m have rank less than m, and that full rank is obtainable only when the submatrix is enlarged to (m+1)×m, this, coupled with the corruption of coordinates during encryption, could further complicate the direct attack on the method described above.

Figure 5:
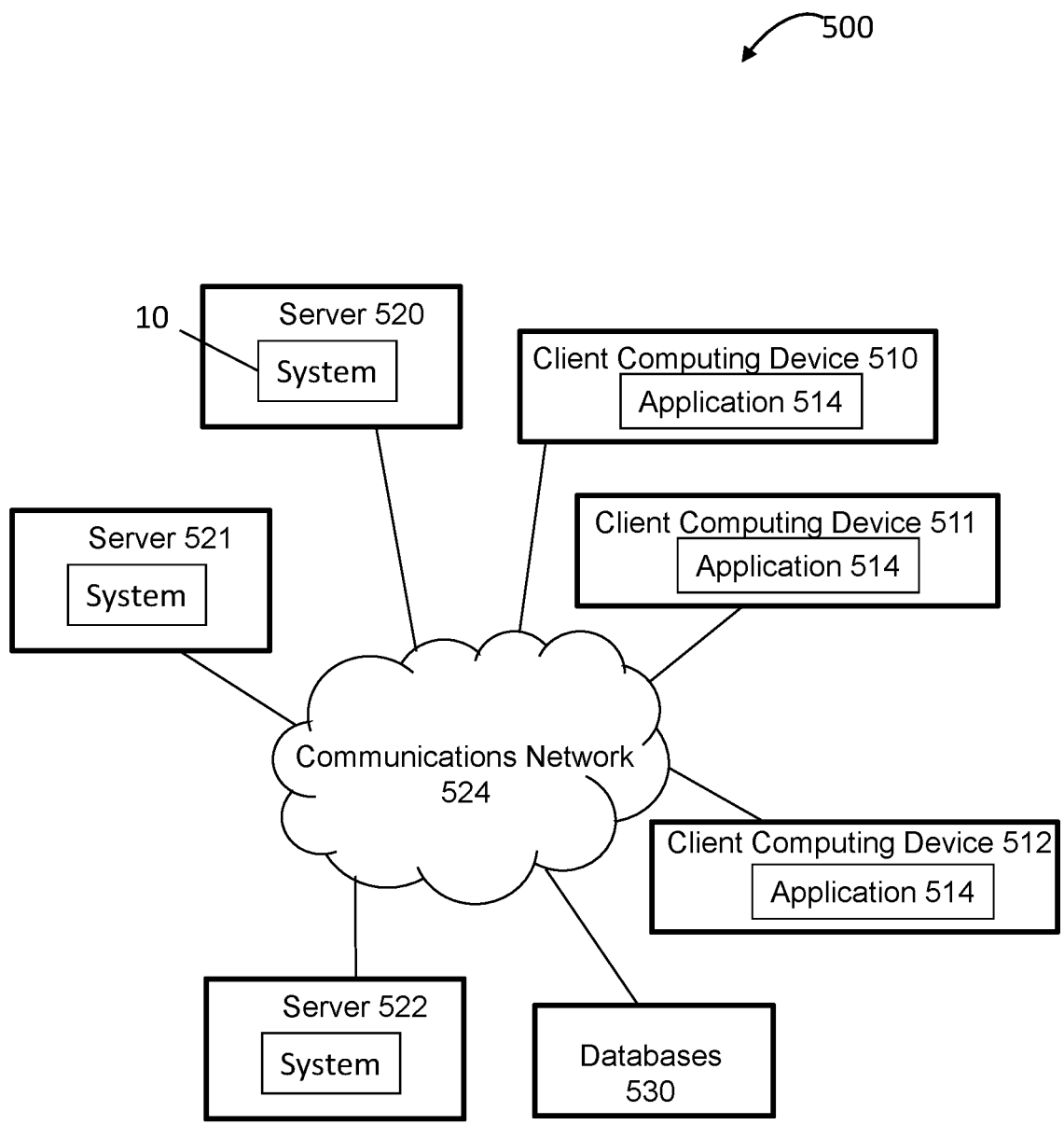
FIG. 5 illustrates an exemplary embodiment of a centralized user matching environment in accordance with embodiments of the present disclosure.

FIG. 5 illustrates an exemplary embodiment of a centralized user matching environment 500 in accordance with embodiments of the present disclosure. The environment 500 includes client computing devices 510-512 operatively coupled to one or more servers 520-522, via a communication network 524, which can be any network over which information can be transmitted between devices communicatively coupled to the network. For example, the communication network 524 can be the Internet, an Intranet, virtual private network (VPN), wide area network (WAN), local area network (LAN), and the like. The environment 500 can include repositories or databases 530, which can be operatively coupled to the servers 520-522, as well as to the client computing devices 510-512, via the communications network 524. Those skilled in the art will recognize that the database devices 530 can be incorporated into one or more of the servers 520-522 such that one or more of the servers can include databases. In an exemplary embodiment, embodiments of the data hiding system 10 can be implemented, independently or collectively, by one or more of the servers 520-522, each of which can be embodied as the computing device 300.

The client computing device 510-512 can be embodied as the mobile computing device 100 and can be operated by users to facilitate interaction with an embodiment of the data hiding system 10 or components thereof implemented by one or more of the servers 520-522. The client computing devices 510-522 can each include a client side application 515 programmed and/or configured to interact with one or more of the servers 520-522. In one embodiment, the client-side application 514 implemented by the client computing devices 510-512 can include a web-browser capable of navigating to one or more web pages hosting GUIs of the system 10. In some embodiments, the client-side application 514 implemented by one or more of the client computing devices 510-512 can be an application specific to the data hiding system 10 to permit interaction with the data hiding system 10 or components thereof that are implemented by the one or more servers (e.g., an application that provides user interfaces for interacting with the servers 520, 521, and/or 522).

The databases 530 can store information for use by the system 10. For example, the databases 530 can store user profiles, user identifiers, encrypted data sets for the users that have been processed by the data hiding process, user matches generated by the system 10, and/or any other suitable information/data that can be used by embodiments of the environments as described herein. For example, users of the client computing devices 510-512 can uploaded profile information, user identifiers, and encrypted data sets for the users that have been processed by the data hiding process to one or more of the servers 520-522, which can store this data/information in one or more of the databases 530 for future use, such as, when searching for and identifying matches.

In an example operation, the client computing devices 510-512 can continuously transmit a user ID (i) and code vector (e=E(x)) data pairs (i, e) to the servers 510-512, which can be tagged as "uninfected". The code vectors are encoded with the location of the client computing devices 510-512 at a specific time or duration of time to the server as described herein. The client computing devices 510-512 can also store the triples (time; location; code vector) in a local database indexed by time and the code vector (e.g. in non-transitory computer-readable media of the client computing devices 510-512), so that code vectors transmitted during a given time interval can be retrieved and time and location data can be recovered from code vectors. If the users of client computing devices 510-512 discover they are infected, the client computing devices 510-512 can retransmit data pairs of user ID and code vectors (i; e) generated by client computing devices 510-512 over the past time period (e.g., two weeks) based on querying the local database) to the servers 520-522, which can now be tagged as "infected".

Upon receipt of data tagged as "uninfected", the servers 510-512 store the pair in a database. Upon receipt of a data tagged "infected", the servers 510-512 retrieve from the database (e.g., based on the matching algorithm described herein) all user ID-code vector pairs (i', e') for which e' matches e. The servers 510-512 then transmits these e' to user tagged with "possible infection". Upon receipt of messages tagged with "possible infection" from the server, the client computing devices 510-512 can recover the infection time and location from code vectors stored on the local database.

Figure 6:
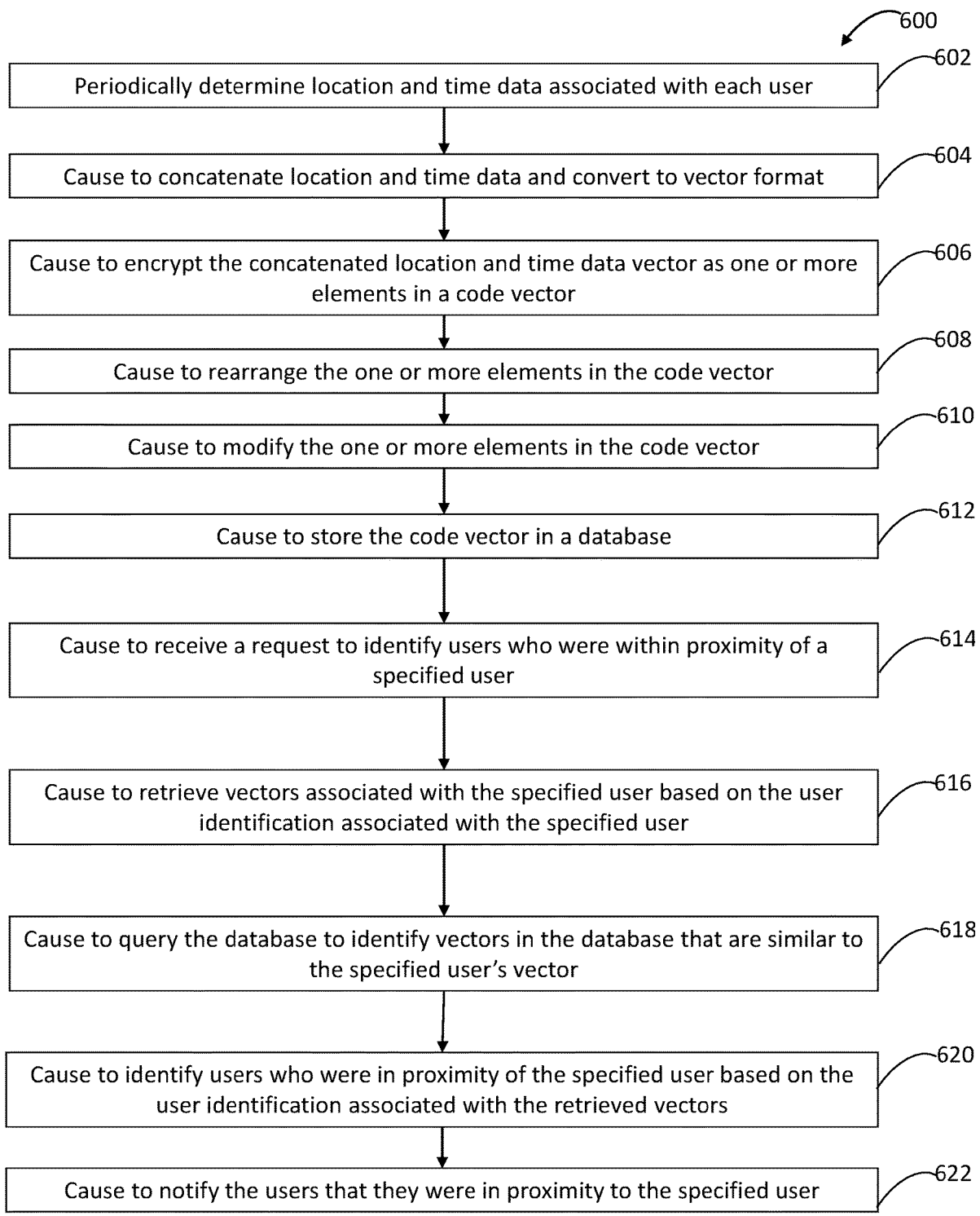
FIG. 6 illustrates an exemplary flowchart depicting a privacy preserving process of tracing a user's movement and proximity to other users in accordance with embodiments of the present disclosure.

FIG. 6 illustrates an exemplary flowchart depicting a privacy preserving process 600 of tracing a user's movement and proximity to other users in accordance with embodiments of the present disclosure. In some embodiments, a first set of one or more operations of process 600 can be executed on the mobile computing device, and a second set of one or more operations of process 600 can be executed on the server. For example, the first set of one or more operations can correspond to operations 602-612, and can be executed on client computing devices (e.g., client computing devices 510-512). The second set of one or more operations can correspond to operations 614-622, and can be executed on servers (e.g., servers 520-522).

Process 600 can begin at operation 602, where locations of users can be periodically determined, and each location can be associated with a time at which each user creates pairs of location-time data.

At operation 604, the process 600 can concatenate location and time data. For example the location data can be followed by the time data or vice versa.

At operation 606, the process 600 can encrypt the concatenated location and time data as a vector of elements for each user and identifiers associated with each of the users.

At operation 608, the process 600 can rearrange, or sort, the elements in the vector in a predetermined manner. For instance, in some embodiments the rearrangement can be a sorting of the elements in a specified manner (e.g., from least to greatest, or greatest to least) for each user.

At operation 610, the process 600 can modify one or more of the elements in each of the vectors for each of the users.

At operation 612, the process 600 can store or send the vectors to a database.

At operation 614, the process 600 can cause to receive a request to identify users that were within proximity of a specified user.

At operation 616, the process 600 can cause to retrieve vectors associated with the specified user based on the user identification for the specified user.

At operation 618, the process 600 can cause to query the database to identify other vectors in the database that match or are similar to the specified user's vectors.

At operation 620, the process 600 can identify users who were in proximity to the specified user based on the user identifications that are associated with the vectors retrieved from the database.

At operation 622, the process 600 can notify the users that they were in proximity to the specified user.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

What is claimed is:

1. A method for encrypting location data associated with a computing device into a code vector to hide the location data, the method comprising:
   converting time and location information associated with the location data of the computing device into a vector format;
   generating the code vector based on the converted time and location vector using a linear or non-linear transformation;
   sorting entries in the code vector based at least in part on a predetermined ordering scheme;
   executing a random modification to each of the sorted entries;
   comparing the code vector to at least one other code vector associated with at least one other computing device;
   determining a distance between the code vector and at least one other code vector; and
   determining, based on the determined distance, whether the computing device and the at least one second computing device were in proximity to each other during a time period corresponding to the time information.

2. The method of claim 1, wherein the computational complexity associated with decoding the code vector renders recovery of the time and location information from the code vector computationally infeasible.

3. The method of claim 1, wherein the time information is concatenated with the location information.

4. The method of claim 1, wherein the code vector is based at least in part on a polynomial over a finite field and a prime number.

5. The method of claim 4, wherein the code vector is further based at least in part on a modulus of the prime number and a vector corresponding to the time and location information associated with the location data.

6. The method of claim 4, wherein converting the time and location information associated with the location data into a vector format comprises:
determining a plurality of digits such that a sum of the product of each of the plurality of digits and a corresponding power of the prime number is equal to the concatenation of the time information and location information;
using the plurality of digits as the coefficients of a polynomial modulo the prime number; and
determining that the code vector comprises integers by evaluating the polynomial at a plurality of integer values.

7. The method of claim 4, wherein the entries in the code vector are sorted in a non-decreasing order.

8. The method of claim 4, wherein random noise is added to entries of the code vector.

9. The method of claim 1, wherein the hidden location data preserves the privacy of an individual associated with the computing device.

10. The method of claim 1, wherein the distance between the code vector and the at least one other vector is a Hamming Distance.

11. The method of claim 10, wherein the Hamming Distance corresponds to the proximity of the computing device relative to at least one other computing device associated with the at least one other code vector during a time period corresponding to the time information.

12. The method of claim 9, wherein the computing device is within a certain proximity of the at least one second computing device during the time period when the Hamming Distance is less than a threshold.

13. A system for encrypting location data associated with a computing device into a code vector to hide the location data, the system comprising:
a database;
an application executing on a mobile computing device, wherein the application:
converts time and location information associated with the location data of the mobile computing device into a vector format;
generates the code vector based on the converted time and location information using a linear or non-linear transformation;
sorts entries in the code vector based at least in part on a predetermined ordering scheme;
executes a random modification to each of the sorted entries; and
transmits the code vector to one or more servers;
wherein the one or more servers are programmed to:
compare the code vector to at least one other code vector associated with at least one other computing device;
determine a distance between the code vector and at least one other code vector; and
determine, based on the distance, whether the computing device and the at least one second computing device were in proximity to each other during a time period corresponding to the time information.

14. The system of claim 13, wherein a computational complexity associated with decoding the code vector renders recovery of the time and location information from the code vector by the server computationally infeasible.

15. The system of claim 13, wherein the time information is concatenated with the location information.

16. The system of claim 13, wherein the code vector is based at least in part on a polynomial over a finite field and a prime number.

17. The system of claim 13, wherein the code vector is further based at least in part on a modulus of the prime number and a vector corresponding to the time and location information associated with the location data.

18. The system of claim 15, wherein the conversions of the time and location information associated with the location data into the vector format causes the application to:
determine a plurality of digits such that the sum of the product of each of the plurality of digits and a corresponding power of the prime number is equal to the concatenation of the time information and location information;
set the coefficients of a polynomial modulo the prime number equal to the plurality of digits; and
determine the code vector of comprises integers by evaluating the polynomial at a plurality of integer values.

19. The system of claim 15, wherein the entries in the code vector are sorted in a non-decreasing order.

20. The system of claim 15, wherein random noise is added to the entries of the code vector.

21. A device for encrypting location data associated with a computing device into a code vector to hide the location data, the device comprising at least one non-transitory computer-readable medium storing computer-executable instructions therein, which when executed by at least one processor, cause the processors to perform the operations of:
converting time and location information associated with the location data of the computing device into a vector format;
generating the code vector based on the converted time and location vector using a linear or non-linear transformation;
sorting entries in the code vector based at least in part on a predetermined ordering scheme;
executing a random modification to each of the sorted entries;
comparing the code vector to at least one other code vector associated with at least one other computing device;
determining a distance between the code vector and at least one other code vector; and
determining, based on the determined distance, whether the computing device and the at least one second computing device were in proximity to each other during a time period corresponding to the time information.

* * * * *

UNITED STATES PATENT AND TRADEMARK OFFICE
CERTIFICATE OF CORRECTION

PATENT NO. : 11,652,622 B2  
APPLICATION NO. : 17/395974  
DATED : May 16, 2023  
INVENTOR(S) : Craig Gotsman et al.

It is certified that error appears in the above-identified patent and that said Letters Patent is hereby corrected as shown below:

On the Title Page

Item (54) and in the Specification Lines 1-2, Column 1, please replace the current title "SYSTEMS AND METHODS FOR PRIVACY-RESERVING DATA HIDING" with the following corrected title:
-- SYSTEMS AND METHODS FOR PRIVACY-PRESERVING DATA HIDING --

Signed and Sealed this  
Fourth Day of July, 2023

Katherine Kelly Vidal  
*Director of the United States Patent and Trademark Office*